United States Patent [19]

Bodwell et al.

[11] Patent Number: 5,238,987
[45] Date of Patent: Aug. 24, 1993

[54] PROPOXYLATED PTB COALESCING AGENTS FOR WATER-BORNE PROTECTIVE COATINGS

[75] Inventors: James R. Bodwell; Stephen H. Harris, both of West Chester; David C. Dehm, Thornton, all of Pa.

[73] Assignee: ARCO Chemical Technology, L.P., Wilmington, Del.

[21] Appl. No.: 960,610

[22] Filed: Oct. 13, 1992

Related U.S. Application Data

[62] Division of Ser. No. 640,451, Jan. 11, 1991, Pat. No. 5,186,744.

[51] Int. Cl.$^5$ ............................................. C08K 5/06
[52] U.S. Cl. ................................. 524/376; 524/507; 524/556; 524/558; 524/560; 524/601; 524/604; 523/406; 523/426; 106/243
[58] Field of Search ............ 524/376, 507, 556, 558, 524/560, 601, 604; 523/406, 426; 106/243

[56] References Cited

U.S. PATENT DOCUMENTS 4,547,223 10/1985 Goto et al. .............................. 106/90
4,814,016 3/1989 Adkins et al. ....................... 106/250
4,888,446 12/1989 Klein et al. .

OTHER PUBLICATIONS

Chem. Abstracts 84 104563m, Chlebieki, Pr. Nauk. Inst. Technol. Org. Tworzyw Sztucznych Politech, Wrochow 1975.
Modern Paint and Coatings, Jun. 1986, pp. 36–42, p. 2, paragraph 2.
Rhoplex WL Emulsions for Acrylic Lacquers for Industrial Finishings–Formulators Guide, Rohm and Haas Company Dec. 1987, pp. 9, 10 p. 3, paragraph 1.
A Defusco–Modern Paint and Coatings, Nov. 1989, pp. 56–66 "New Coalescing Solvents Advanced Formulation of Latex Coating".
D. Gutheie and R. Czerepinski–American Paint and Coatings Journal Jul. 27 and Aug. 3, 1987.
D. Guthrie in American Paint and Coatings Journal Jul. 11, 1988, pp. 54–61.

*Primary Examiner*—Joseph L. Schofer
*Assistant Examiner*—Jeffrey T. Smith
*Attorney, Agent, or Firm*—Jonathan L. Schuchardt

[57] ABSTRACT

Versatile coalescing agents for water-borne coating applications are disclosed. The coalescents comprise propoxylated propylene glycol tert-butyl ether and one or more organic solvents, particularly glycol ethers. These coalescents efficiently reduce minimum film-forming temperature, and also have a dramatically reduced tendency to swell resins compared with prior art coalescents.

6 Claims, No Drawings

PROPOXYLATED PTB COALESCING AGENTS FOR WATER-BORNE PROTECTIVE COATINGS

This is a division of application Ser. No. 07/640,451, filed Jan. 11, 1991, now U.S. Pat. No. 5,186,744.

FIELD OF THE INVENTION

This invention relates to the development of coalescing agents for use in water-borne protective coatings. We have found that propoxylated propylene glycol tert-butyl ether (propoxylated PTB) and mixtures of propoxylated PTB with organic solvents are versatile coalescents for the preparation of coatings with superior film-forming ability and rapid hardness development.

BACKGROUND OF THE INVENTION

Coalescing agents, or coalescents, are key components in water-borne protective coatings. Glycol ethers, such as ethylene glycol n-butyl ether (EB), diethylene glycol n-butyl ether (DB), propylene glycol monomethyl ether (PM), and dipropylene glycol monomethyl ether (DPM), are commonly used in water-based systems. The glycol ether functions as a coalescent which couples dispersed or emulsified polymer resin particles with water, and helps to keep them dispersed.

Water-borne systems have become increasingly important for environmental reasons, and also because water-borne systems now offer comparable performance to solvent-based systems. Water-borne systems include dispersions and emulsions. Dispersions contain resins such as epoxies, alkyds, polyesters, and acrylics, which can be converted to charged, water-soluble species upon combination with a neutralizing agent. Following application of a water-based dispersion, the water evaporates more quickly than most of the coalescent; the coalescent softens the resin, and allows resin particles to fuse together to form a continuous film. Emulsions contain resins such as acrylic, styrene-butadiene, and polyvinyl acetate. These resins form latex spheres that are emulsified in water with the aid of a surfactant. Upon application, the coalescent evaporates slowly enough from the latex spheres to allow them to coalesce.

Ethylene glycol-derived ethers (E-series ethers) are commonly used in water-borne coatings. Unfortunately, many E-series ethers are toxic, and worker exposure to these chemicals is now regulated. Glycol ethers derived from propylene glycol (P-series ethers), including propylene glycol tert-butyl ether (PTB), offer a low-toxicity alternative to formulators, as described by R. Heckman ("Using P-Series Glycol Ethers in Water-Reducible Coatings, " *Modern Paint and Coatings*, June 1986, pp. 36–42). Propoxylated PTB is expected to have toxicity characteristics similar to those of PTB.

Ethylene glycol n-butyl ether (EB) is widely used in the coatings industry as a coalescing agent. In addition to its acute toxicity, EB has an undersirable tendency to swell water-borne resins. Unfortunately, the swelling problem is rather unpredictable and varies dramatically with changes in pH. As a result, coating compositions containing EB have viscosities that are highly pH-dependent, especially within pH=8-9, a range commonly employed in formulating water-borne coatings. Coating compositions made with EB are therefore difficult to use.

The acute sensitivity of formulation viscosity to changes in pH when ethylene glycol n-butyl ether (EB) is employed as a coalescent is well illustrated in "RHOPLEX WL Emulsions for Acrylic Lacquers for Industrial Finishing—Formulator's Guide," (Rohm and Haas Company, Dec. 1987) on pages 9 and 10. As shown in FIG. 3E of this reference, the 24hour equilibrated viscosity of a "RHOPLEX WL-91 " water-based formulation with EB as the coalescent increases dramatically from about 1000 cps at pH=7.8 to greater than 10,000 cps at pH=8.4. Because of this steep dependence of viscosity on pH, formulators using conventional coalescents such as EB or EB/DB blends have needed to exercise great care in controlling pH; more flexibility would be highly desirable.

To overcome the pH/viscosity sensitivity problem, formulators commonly increase the level of solvents (typically volatile organic compounds) used in the formulations. Because of increasingly strict emission regulations, coating formulators are being forced to lower the VOC content (increase the percent solids content) of their coatings. Finding coalescents that reduce the viscosity/pH sensitivity of resins would enable formulators to decrease the level of viscosity-reducing solvents needed, thereby reducing VOC emissions and formulation cost.

Some glycol ether coalescents, such as propylene glycol tert-butyl ether (PTB), evaporate too rapidly to allow film formation for some formulations. Others evaporate too slowly, resulting in coatings with poor hardness development profiles.

Another problem in the art is to find suitable coalescents that also have the ability to give coatings with satisfactory minimum film-forming temperatures (MFFT) at low coalescent levels.

It is therefore an object of this invention to provide coalescing agents that have utility in water-based protective coatings, safe handling compared with E-series glycol ethers, viscosities that are relatively insensitive to changes in pH, satisfactory evaporation rates, and good minimum film-forming characteristics.

SUMMARY OF THE INVENTION

This invention provides versatile coalescing agents for use in water-based protective coatings. The coalescents are useful for preparing coatings with good film-forming and hardness development characteristics. In addition, coating compositions made with the coalescents of the invention have relatively flat pH-viscosity profiles, which enables formulators to make coatings with reproducible viscosities.

The coalescents of the invention comprise:

(a) from about 1 to 99 weight percent of one or more propylene oxide adducts of propylene glycol tert-butyl ether having the formula:

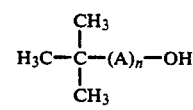

wherein n is an integer from 2 to 6, and A is an oxypropylene unit; and (b) from about 1 to 99 weight percent of an organic solvent. Preferably, the organic solvent is selected from the group consisting of alcohols, glycols, glycol ethers, glycol ether esters, ketones, esters, aliphatic and aromatic hydrocarbons, halogenated hydrocarbons, nitriles, amides, and carbonates.

The invention also provides water-borne coating compositions that include the coalescents described above. The compositions comprise a water-borne resin, water, and a coalescent.

DETAILED DESCRIPTION OF THE INVENTION

The propoxylated PTB glycol ether coalescents of the invention may be prepared by any number of methods well known to those skilled in the art. Propylene glycol tert-butyl ether (PTB), a glycol ether known in the art as a useful cosolvent for water reducible coatings (see *Modern Paint and Coatings*, June 1988, pp. 36–42), can be reacted with propylene oxide under basic conditions to give propoxylated PTBs, as illustrated in U.S. Pat. No. 4,888,446. Generally, a distribution of products results from propoxylation of the PTB. If one uses, for example, two moles of propylene oxide (PO) for each mole of PTB, a complex mixture of products typically results, and oligomeric products containing from 0 to 6 or 7 oxypropylene units comprise the bulk of the product mixture. The glycol ethers can also be prepared from the reaction of glycols such as dipropylene glycol, tripropylene glycol, etc., with isobutylene under acidic conditions.

The coalescents of the invention include propylene oxide adducts of propylene glycol tert-butyl ether having the general formula:

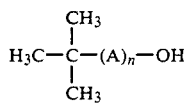

wherein n is an integer from 2 to 6, and A is an oxypropylene unit having the structure:

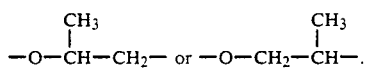

The oxypropylene units may be configured in any manner; for example the oxypropylene units may be primarily or exclusively of one variety, such as all

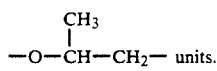

Alternatively, an essentially random distribution of

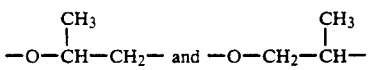

units may be present, depending on the method of preparation. The glycol ethers may therefore have either secondary or primary hydroxyl end groups. Mixtures of glycol ethers having either primary or secondary hydroxyl end groups may also be used.

The coalescents of the invention are produced by combining from about 1 to 99 weight percent of a glycol ether as described in the preceding paragraph with from about 1 to 99 weight percent of an organic solvent. Preferably, the organic solvent is selected from the group consisting of alcohols, glycols, glycol ethers, glycol ether esters, ketones, esters, aliphatic and aromatic hydrocarbons, halogenated hydrocarbons, nitriles, amides, and carbonates. The relative amounts of propoxylated PTB and organic solvent used will depend on the particular application. Mixtures of organic solvents may be used to optimize specific coating properties or achieve satisfactory resin solubility. Preferred organic solvents are E- and P-series glycol ethers, including, but not limited to, propylene glycol tert-butyl ether, propylene glycol n-butyl ether, propylene glycol methyl ether, propylene glycol ethyl ether, propylene glycol phenyl ether, ethylene glycol n-butyl ether, diethylene glycol ethyl ether, and the like, and mixtures thereof. Particularly preferred is propylene glycol tert-butyl ether.

The coalescing agents of the invention are useful in water-borne latex coating compositions. These compositions typically comprise: (a) from about 20 to 60 parts by weight of a water-borne resin; (b) from about 15 to 80 parts by weight of water, and (c) from about 1 to 25 parts by weight of a coalescing agent selected from the group consisting of one or more propylene oxide adducts of propylene glycol tert-butyl ether and mixtures thereof with one or more organic solvents.

The water-borne resin may be any dispersion or emulsion-type resin known in the art to be useful for making protective coatings. Examples of suitable water-borne resins include, but are not limited to, alkyds, epoxies, polyesters, polyurethanes, acrylics, styrene resins, styrene-acrylic resins, styrene-butadiene resins, polyvinyl acetate resins, and the like, and useful combinations thereof.

The water-borne coating compositions of the invention may include additives such as flow-control agents, adhesion promoters, cure catalysts, surfactants, plasticizers, pigments, mar aids, and the like. Such additives and the methods of using them are well known in the art.

Amines or alkanolamines may be added to the coating compositions as needed to adjust the pH of the compositions. Typically, the pH of most coating compositions falls within the range of about 7–10, more typically about 8–9. Neutralization of water-borne coating systems is often desirable because charged polymer particles tend to have better water dispersibility, and thus neutralization with an amine or alkanolamine can help to stabilize a coating formulation. Examples of suitable amines and alkanolamines include, but are not limited to, aqueous ammonium hydroxide, triethylamine, triethanolamine, ethanolamine, N,N-dimethylethanolamine and the like, and mixtures thereof. Particularly preferred is aqueous ammonium hydroxide.

Generally speaking, the coating compositions of the invention are prepared by combining, in any order desired, a water-borne resin, water, and the propoxylated PTB coalescent, together with any desired additives, such as cosolvents, plasticizers, surfactants, mar aids, flow aids, etc. The formulations are blended well until a homogeneous product is obtained.

The coating compositions may be applied to a substrate by any of the methods known in the art, such as brushing, spraying, dipping, and the like. The newly applied coating is typically allowed to dry at ambient or elevated temperature. Oven-drying may be used if desired to accelerate the rate of drying.

Propoxylated PTB is a versatile coalescent. Properties can often be tailored to fit specific applications either by blending with another glycol ether such as PTB, or by varying the average number of oxypropylene units present. Less-volatile coalescents may be easily prepared by adding more oxypropylene units to the molecule.

The following examples illustrate the invention. Those skilled in the art will recognize many possible variations that are within the spirit and scope of the claimed invention.

Preparation on Mono-Propoxylated PTB

"ARCOSOLV PTB" propylene glycol tert-butyl ether (500 g) was combined with potassium hydroxide pellets (28.6 g) in a three-neck round-bottom flask. The mixture was distilled under nitrogen at atmospheric pressure to remove the PTB/water azeotrope, giving a product residue (383 g) containing 7.5% potassium.

An autoclave reactor was charged with 201 g of the alkoxide produce residue described above, along with propylene glycol tert-butyl ether (2261 g). The mixture was stirred and heated to 110° C. Propylene oxide (538 g) were added over a 1.5-hour period. The product was kept at 110° C. for an additional 2 hours following completion of the PO addition. The product, which contained PTB (56%), mono-propoxylated PTB (30%), and heavies (24), was distilled through an Oldershaw column to give monopropoxylated PTB (771 g) in 99.8% purity. (B.p. 114° C. @ 40 mm).

Method of Application of Coatings

All coatings were drawn down onto "BONDERITE 1000" steel panels using the wire-wound rod necessary to obtain a one-mil dry-film thickness. The films were allowed to dry in air under ambient conditions for seven days prior to testing by standard ASTM methods.

Comparative Example 1

Water-based Clear Metal Coating—"RHOPLEX WL-91" Resin EB/DB coalescent

"RHOPLEX WL-91" resin (637.7 parts) was premixed with water (107.9 parts) and "PATCOTE 519" defoamer (1.5 parts). Separately, ethylene glycol n-butyl ether (EB) (79.5 parts) was premixed with diethylene glycol n-butyl ether (DB) (13.2 parts), di-n-butyl phthalate (13.2 parts), and "BYK-301" mar aid (1.33 parts). The glycol ether mixture was added to the resin mixture under good mechanical agitation. Mixing was continued until a homogeneous blend was obtained.

Example 2

Water-based Clear Metal Coating—"RHOPLEX WL-91" Resin PTB/Propoxylated PTB Coalescent The procedure of Comparative Example 1 was followed except that a mixture of propylene glycol tert-butyl ether (PTB) (84.3 parts) and mono-propoxylated PTB (8.3 parts) (prepared as described above) was used in place of the EB/DB coalescent blend.

TABLE 1

| Water-borne Coatings from "RHOPLEX WL-91" Resin | | |
|---|---|---|
| Formulation Example # | C-1 | 2 PTB/propoxylated |
| Coalescent | EB/DE | PTB |
| Film formation | yes | yes |
| Pencil hardness (ASTM D-3363) | | |
| 2 hours | F | H |
| 1 week | H | H |
| 2 weeks | H | 2H |
| MFFT (°C.) | <−5.0 | −4.5 |
| Viscosity (cps) | | |
| 10 rpm | 870 | 335 |
| 100 rpm | 265 | 106 |
| Sward hardness (ASTM D2354) | | |
| (30 min) | 44 | 64 |

The preparation of water-based clear metal coating compositions based on "RHOPLEX WL-91" resin (Rohm and Haas Company) using either a blend of EB/DB or PTB/propoxylated PTB is described in Examples 1–2. The physical properties of the applied coatings appear in Table 1. Satisfactory films with good hardness development and low minimum film-forming temperature were formed in each case. The PTB/propoxylated PTB blend had a much lower viscosity, however, and also produced a film having a superior Sward hardness compared with the EB/DB blend.

Comparative Example 3

Water-Based Clear Gloss Metal Lacquer—"NEOCRYL A-639" Resin EB coalescent

A premixed blend of water (18.2 parts), EB (92.2 parts), di-n-butyl phthalate (15.4 parts), "DC-14" flow aid (4.5 parts), aqueous ammonia (2.56 parts of a 28% solution), and aqueous ammonium benzoate (13.4 parts of a 10% solution) was added slowly with good agitation to "NEOCRYL A-639" resin (681.8 parts). Mixing was continued until a homogeneous blend was obtained. Water (18.2 parts) was added to adjust the viscosity to a value of 45 seconds (#2 Zahn cup).

Comparative Example 4

Water-Based Clear Gloss Metal Lacquer—"NEOCRYL A-639" Resin PTB Coalescent

The procedure of Comparative Example 3 was followed except that PTB (92.2 parts) was used in place of EB.

Example 5

Water-Based Clear Gloss Metal Lacquer—"NEOCRYL A-639" Resin PTB/Propoxylated PTB Coalescent Blend The procedure of Comparative Example 3 was followed except that a mixture of PTB (83.9 parts) and propoxylated PTB (8.3 parts) was used in place of EB.

TABLE 2

| Water-borne Coatings from "NEOCRYL A-639" RESIN | | | |
|---|---|---|---|
| Formulation Exanmple # | C-3 | C-4 | 5 PTB/propoxylated |
| Coalescent | EB | PTB | PTB |
| Film formation | yes | no | yes |
| Pencil hardness | | | |
| 2 hours | 3B | — | 3B |
| 8 hours | B | — | 3B |
| 1 week | B | — | B |
| Gloss (60°) (ASTM D-523) | | | |
| against grain | 95 | — | 102 |
| with grain | 111 | — | 114 |
| MFFT (°C.) | −0.3 | — | 2.3 |
| Viscosity (cps) | | | |

TABLE 2-continued

Water-borne Coatings from "NEOCRYL A-639" RESIN

| Formulation Example # Coalescent | C-3 EB | C-4 PTB | 5 PTB/propoxylated PTB |
|---|---|---|---|
| 10 rpm | 172 | 147 | 197 |
| 100 rpm | 78 | 55 | 70 |

The preparation of water-based clear gloss metal lacquer compositions based on "NEOCRYL A-639" resin (ICI) using EB, PTB, or a blend of PTB and propoxylated PTB is described in Examples 3-5. The physical properties of the applied coatings appear in Table 2. Nonviscous formulations and good films were produced with the PTB/propoxylated PTB coalescent blend. Surprisingly, PTB alone as a coalescent failed to give satisfactory film formation with this resin, probably due to premature evaporation of the coalescent from the resin.

TABLE 3

Effect of Propoxylated PTB on Minimum Film-Forming Temperature

| | Percent Coalescent on Resin Solids required for film formation at 50° F. | | | |
|---|---|---|---|---|
| Resin | EB | EB/DB (86/14) | PTB | Propoxylated PTB |
| "NEOCRYL A-639" | 31 | — | 69 | 24 |
| "RHOPLEX WL-91" | — | 31 | 67 | 27 |

A key advantage of propoxylated PTB coalescents is their ability to efficiently reduce the minimum film-forming temperature of water-borne coatings. Surprisingly, we found that very little propoxylated PTB coalescent was required for satisfactory film formation at 50° F. when either "RHOPLEX WL-91" or "NEOCRYL A-639" was used as the resin (Table 3). The amount of propoxylated PTB coalescent needed was substantially less than the amount of EB or EB/DB blend required, and was far superior in comparison with PTB.

TABLE 4

Effect of Coalescent on pH/Viscosity Profile of "RHOPLEX WL-91" Formulation

| | Viscosity (cps) | |
|---|---|---|
| pH | EB/DB (86/14) | Propoxylated PTB |
| 7.3 | — | 59 |
| 7.6 | 270 | — |
| 8.5 | 2250 | 670 |
| 9.0 | 2100 | 530 |
| 9.5 | 2400 | 350 |
| 10.3 | 650 | — |
| 10.6 | — | 79 |

Prior art coalescents have an undesirable tendency to swell coating resins. This swelling tendency, which is normally pH-dependent, results in pH-sensitive coating viscosities. PTB alone does not exhibit the swelling problems commonly observed with EB, but PTB alone is often a poor coalescent (see Tables 2 and 3).

Surprisingly, we found that propoxylated PTB coalescents avoid the swelling problems with prior art coalescents while also maintaining satisfactory film-forming characteristics. Using propoxylated PTB in the "RHOPLEX WL-91" formulation gave coatings having viscosities that were much less sensitive to changes in pH compared with the EB/DB coalescent (Table 4). The peak viscosity of the "RHOPLEX WL-91" formulation with the propoxylated PTB coalescent (670 cps) was 3 or 4 times less than that observed with EB/DB (2400 cps). This is an important advantage because it gives formulators more control over product viscosity, and allows them to formulate at higher solids (lower VOC) levels while maintaining the desired viscosity.

| Trademark | Product of |
|---|---|
| "RHOPLEX WL-91" resin[1] | Rohm and Haas Company |
| "NEOCRYL A-639" resin[2] | ICI |
| "PATCOTE 519" defoamer[3] | Patco Chemical |
| "BYK 301" mar aid[4] | Byk-Chemie |
| "DC-14" flow aid[5] | Dow Corning |
| "BONDERITE 1000" steel panels | Parker Chemical Company |
| "ARCOSOLV PTB" glycol ether[6] | ARCO Chemical Company |

[1] An emulsion containing an acrylic copolymer (41-42 wt. %), ammonia (0.1 wt. % maximum), and water (58-59 wt. %).
[2] An acrylic copolymer emulsion having 55 wt. % of volatile material (water) and 0.2 wt. % of ammonia.
[3] Amorphous silica (3-5 wt. %), paraffinic solvent (70-75 wt. %), and the balance of proprietary ingredients.
[4] Solution of polyether-modified dimethylpolysiloxane copolymer in 2-butoxyethanol (50 wt. % 2-butoxyethanol).
[5] Silicone glycol in isopropyl alcohol (90 wt. % isopropyl alcohol).
[6] Propylene glycol tert-butyl ether (100%).

We claims:

1. A latex coating composition having good film-forming characteristics and rapid hardness development upon application, said composition comprising:
   (a) from about 20 to 60 parts by weight of a water-borne resin;
   (b) from about 15 to 80 parts by weight of water; and
   (c) from about 1 to 25 parts by weight of a coalescing agent selected from the group consisting of propylene oxide adducts of propylene glycol tert-butyl ether, and mixtures thereof with one or more organic solvents.

2. The composition of claim 1 wherein the water-borne resin is selected from the group consisting of dispersions and emulsions.

3. The composition of claim 1 wherein the water-borne resin is a resin selected from the group consisting of alkyds, epoxies, polyesters, polyurethanes, acrylics, styrene resins, styrene-acrylic resins, styrene-butadiene resins, and polyvinyl acetate resins.

4. The composition of claim 1 comprising an additive selected from the group consisting of surfactants, plasticizers, pigments, mar aids, flow aids, and mixtures thereof.

5. The composition of claim 1 comprising an amount of an amine or alkanolamine sufficient to adjust the pH of said composition to a value within the range of about 8 to 9.

6. The composition of claim 5 wherein said amine is aqueous ammonium hydroxide.

* * * * *